March 14, 1944.  B. G. CARLSON  2,344,126
HORIZON GYRO
Filed June 4, 1942  2 Sheets-Sheet 1
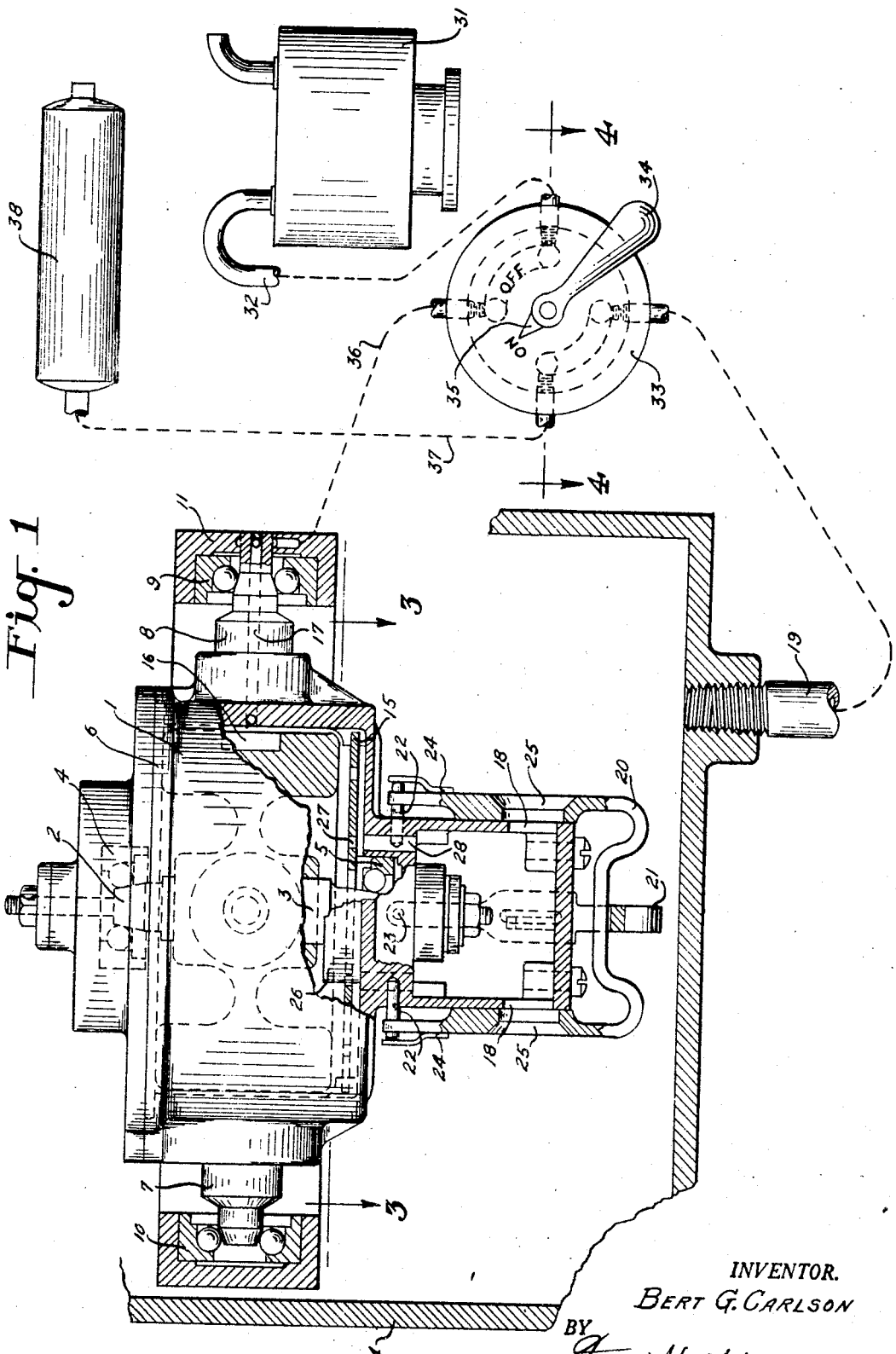
INVENTOR.
BERT G. CARLSON
BY
*Frank H. Swanson*
ATTORNEY March 14, 1944. B. G. CARLSON 2,344,126
HORIZON GYRO
Filed June 4, 1942 2 Sheets-Sheet 2
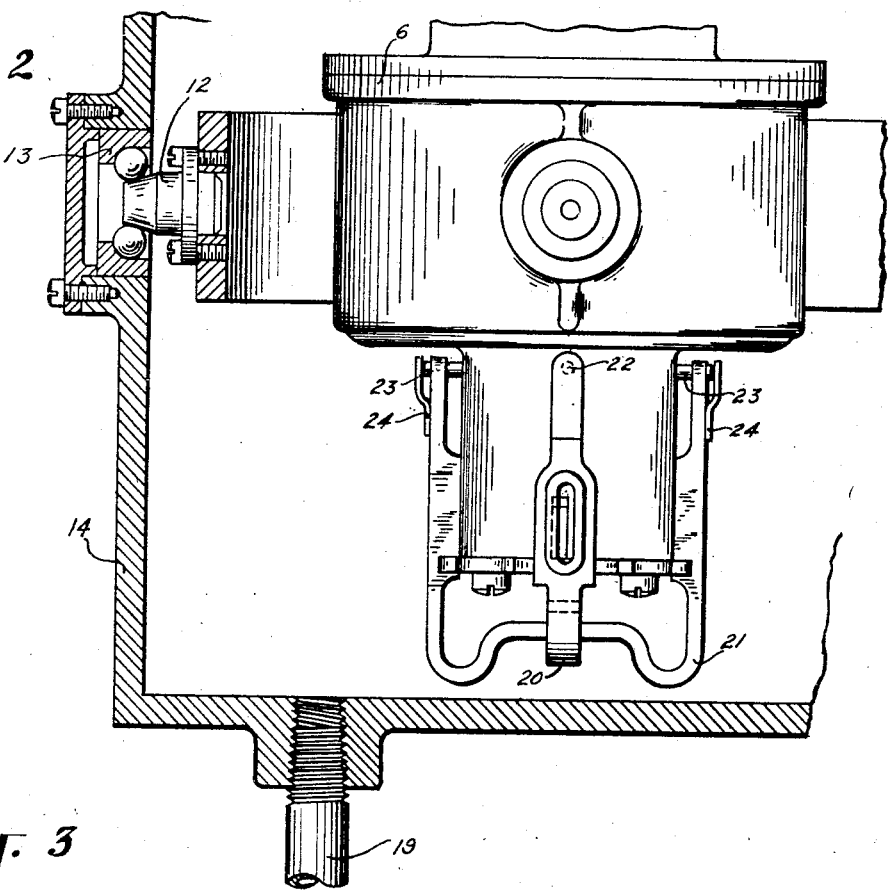
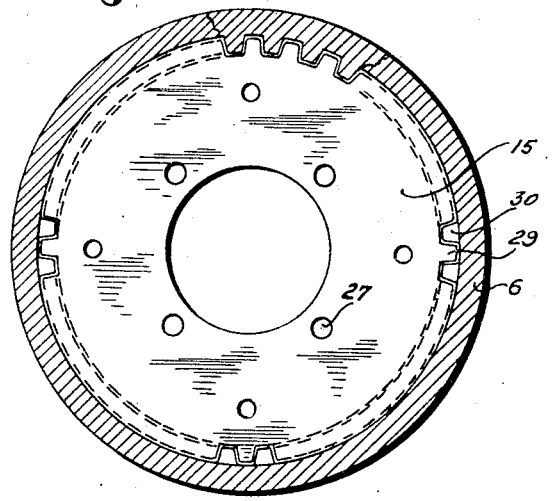
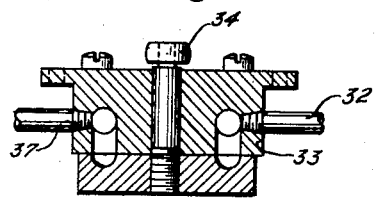
INVENTOR.
BERT G. CARLSON
BY
Frank N. Halmon
ATTORNEY Patented Mar. 14, 1944

2,344,126

UNITED STATES PATENT OFFICE 2,344,126

HORIZON GYRO

Bert G. Carlson, Erieside, Ohio, assignor to Jack & Heintz, Inc., Bedford, Ohio, a corporation of Ohio Application June 4, 1942, Serial No. 445,793

9 Claims. (Cl. 74—5)

This invention relates in general to gyroscopic apparatus and more particularly to a new and novel method and means of erecting an horizon gyro.

It has heretofore been the practice to utilize either mechanical or electrical means for erecting a vertical, or horizon, gyro with respect to its base position regardless of whether such erection was or was not with respect to the gravitational vertical. Thus if the gyro were erected during blind flying or actually in a cloud there would be no means of knowing whether the gyro were erected to the true gravitational vertical and hence no assurance of obtaining the true horizontal indication necessary for blind flying.

It is therefore the primary object of this invention to provide a method and means of erecting a vertical gyro to the gravitational vertical and to provide a true horizontal indication.

In carrying out this and other objects it is proposed to provide an air braking means incorporated in the gyro wheel housing to include a floating brake plate and a hand valve controlled air flow system which flow is reversible so that the brake may be applied and the gyro wheel quickly erected to the gravitational vertical and also quickly released and air pressure spinning force quickly applied to the gyro wheel.

With the foregoing and other objects in view, the invention resides in the new and novel method and means and in the combination of parts and details of construction hereinafter set forth in the following specification and appended claims, certain embodiments thereof being illustrated in the accompanying drawings, in which:

Figure 1 is a view in side elevation, partly in section, of the gyro and the erecting means and fragmentarily in section showing the box and valve control together with the air pump and filter and pipe lines shown schematically;

Figure 2 is a similar view of the gyro and box taken at right angles to that shown in Figure 1;

Figure 3 is a view in section taken along line 3—3 of Figure 1 showing the gyro erecting brake and its guide means; and Figure 4 is a view in section through the control valve taken along line 4—4 of Figure 1.

Referring more particularly to the drawings, the horizon gyro wheel 1 has its trunnions 2 and 3 mounted in bearings 4 and 5 in its housing 6 for spinning about a vertical axis. The housing is provided with trunnions 7 and 8 to be received in bearings 9 and 10 in the inner gimbal ring 11 for one plane of movement and ring 11 is provided with trunnions 12 to be received in bearings 13 in the box 14.

The gyro wheel 1 is provided with the usual buckets 16 to be impinged by fluid coming into the gyro housing through the jet 17 formed in the trunnion 8. The fluid then passes from the upper, or rotor, compartment of the gyro housing down through openings 18 into the box and out through the outlet pipe 19.

The erection pendulums in the present embodiment may comprise the stirrup-shaped members 20 and 21 pivoted at 22 and 23, respectively. The erection pendulums 20 and 21 swing freely upon the pivots 22 and 23 and may be retained in place thereon by spring elements 24. These pendulums are provided with openings 25 opposite the ports 18, the arrangement being such that the openings normally uncover half of each port in the manner shown. It is to be noted that any movement of one of the erection pendulums 20 or 21 tends to completely cover one port simultaneously with the uncovering of the opposite port. Any inclination of the gyroscope from the vertical will result in a corresponding movement of the pendulums 20 and 21 to increase the size and strength of the air jet on one side of the box 14 and simultaneously reduce the size and strength of the air jet on the opposite side of the box, thereby restoring the vertical position of the rotor bearing casing through precession.

*As previously stated, instead of erecting the gyro by mechanical or electrical means and with respect to its base position the present invention provides means for erecting the gyro to the gravitational vertical without regard to its base position. In accomplishing this for the purpose of providing a true horizontal indication necessary for blind flying, a braking means is incorporated in the gyro wheel housing so as to act directly on the wheel and the braking means is entirely disconnected from the remainder of the housing assembly. It comprises a friction brake plate 15 formed with a central opening to slidably fit over the outer wall 26 of the bearing housing and provided with a series of apertures 27 to register with the passageways 28. The brake plate is fully floating with respect to vertical movement but may have its periphery formed with splines 29 to correspond with splines 30 on the inner wall of the housing 6 so as to properly guide the vertical movement and alignment of the brake plate in its positions of movement.

In the normal operation of the gyro wheel, air, or other fluid, is drawn in from a suitable vacuum pump 31 through a pipe 32 into a valve assembly 33. When the valve handle 34 is turned so that the pointer 35 is in "on" position, connection is made between pipe 32 and pipe 36 for furnishing pressure fluid through the jet 17 to spin the gyro wheel. The pressure fluid exhaust is through the apertures 27, passage 28, outlet 18 and 25 and out of the box through pipe 19, through the valve assembly and out through pipe 37 and filter 38 to atmosphere. During such normal operation the brake plate remains in its lower position due to gravity and fluid pressure and out of engagement with the gyro wheel which spins freely under the influence of the pressure fluid flowing through jet 17.

When it is desired to erect the gyro, the valve handle 34 is turned until the pointer 35 is on the "off" position. This connects the line 32 from the vacuum pump with line 19 to supply pressure fluid into the box through ports 25 and 18 and passage 28 and against the under side of the brake plate. The valve being in "off" position further reverses the flow by shutting off the supply of pressure fluid to the jet 17 and connects line 36 with line 37 and filter 38 to atmosphere. This reverse of flow causes a reverse of unequalization of pressure within the gyro wheel housing above and below the brake plate and causes the latter to float upwardly so as to frictionally engage the under face of the gyro wheel. The resulting effect is to quickly brake and stop the spinning of the gyro wheel which is really idling as soon as the impelling force of the pressure fluid through the jet 17 has been cut off.

As quickly as the gyro has thus been erected the valve is turned again to "on" position which immediately reverses the flow so as to release the brake and furnish pressure fluid again through the jet and to the buckets of the gyro wheel.

From the foregoing, it will be readily seen that there has been provided a new and novel method and means for erecting a gyro wherein no electrical or mechanical means are employed that are dependent upon the attitude of the box, its gimbals or other parts of the assembly aside from the gyro wheel and its housing. In other words by this simple and effective method and means of reversal of flow of pressure fluid and the application of braking force on the gyro wheel itself by a floating brake plate, the gyro may be quickly and properly erected with respect to the gravitational vertical without regard to its base position.

I claim:

1. In an horizon gyro, a spinning gyro wheel mounted for rotation about a vertical axis and fluid pressure means for exerting a spinning force on said wheel, means for erecting said gyro including means for reversing the flow of said fluid, hand control means for reversing said flow for discontinuing said force and a floating brake disc simultaneously operated by the reversely flowing fluid to engage said gyro wheel to stop the spinning of the same.

2. In an horizon gyro, a spinning gyro wheel mounted for rotation about a vertical axis and fluid pressure means for exerting a spinning force on said wheel, means for erecting said gyro including means for reversing the flow of said fluid, hand control means for reversing said flow for discontinuing said force and a floating brake disc simultaneously operated by the reversely flowing fluid to frictionally engage said gyro wheel to stop the spinning of the same.

3. In an horizon gyro, a spinning gyro wheel mounted for rotation about a vertical axis and fluid pressure means for exerting a spinning force on said wheel, means for erecting said gyro including means for reversing the flow of said fluid, hand control means for reversing said flow for discontinuing said force and a floating brake disc simultaneously operated by the reversely flowing fluid to frictionally engage said gyro wheel to stop the spinning of the same and guide means for said brake disc in its vertical movements.

4. In an enclosed pendulum horizon gyro including an inner and outer gimbal ring and a gyro wheel mounted in a housing for spinning about a vertical axis, a source of fluid pressure leading to said gyro wheel within its housing to exert a spinning force to said wheel and a fluid discharge outlet from said housing, means for erecting said gyro to the gravitational vertical, a floating brake disc normally out of contact with said gyro wheel, control means for reversing said flow for discontinuing said force for evacuating the gyro wheel housing and applying a positive force through said discharge outlet for forcing said brake disc into contact with said gyro wheel to stop the spinning of the same until said gyro is properly erected.

5. In an enclosed pendulum horizon gyro including an inner and outer gimbal ring and a gyro wheel mounted in a housing for spinning about a vertical axis, a source of fluid pressure leading to said gyro wheel and a fluid discharge outlet from said housing, means for erecting said gyro to the gravitational vertical, a floating brake disc normally out of contact with said gyro wheel, control means for reversing said flow for discontinuing said force for evacuating the gyro wheel housing and applying a positive force through said discharge outlet for forcing said brake disc into frictional contact with said gyro wheel to stop the spinning of the same until said gyro is properly erected.

6. In an enclosed pendulum horizon gyro including an inner and outer gimbal ring and a gyro wheel mounted in a housing for spinning about a vertical axis, a source of fluid pressure leading to said gyro wheel and a fluid discharge outlet from said housing, means for erecting said gyro to the gravitational vertical, a floating brake disc normally out of contact with said gyro wheel, control means for reversing said flow for discontinuing said force for evacuating the gyro wheel housing and applying a positive force through said discharge outlet for forcing said brake disc into frictional contact with said gyro wheel to stop the spinning of the same until said gyro is properly erected and guide means for said brake disc in its vertical movements.

7. In an enclosed pendulum horizon gyro including an inner and outer gimbal ring and a gyro wheel mounted in a housing for spinning about a vertical axis, a source of fluid pressure leading to said gyro wheel within its housing to exert a spinning force to said wheel and a fluid discharge outlet from said housing, means for erecting said gyro to the gravitational vertical, a floating brake disc arranged within said gyro wheel housing and arranged between said wheel and said outlet, control means for reversing said flow for discontinuing said force for evacuating the gyro wheel housing and applying a positive force through said discharge outlet for forcing said brake disc into contact with said gyro wheel to stop the spinning of the same until said gyro is properly erected.

8. In an enclosed pendulum horizon gyro including an inner and outer gimbal ring and a gyro wheel mounted in a housing for spinning about a vertical axis, a source of fluid pressure leading to said gyro wheel within its housing to exert a spinning force to said wheel and a fluid discharge outlet from said housing, means for erecting said gyro to the gravitational vertical, a floating brake disc arranged within said gyro wheel housing and arranged between said wheel and said outlet, control means for reversing said flow for discontinuing said force for evacuating the gyro wheel housing and applying a positive force through said discharge outlet for forcing said brake disc into frictional contact with said gyro wheel to stop the spinning of the same until said gyro is properly erected.

9. In an enclosed pendulum horizon gyro including an inner and outer gimbal ring and a gyro wheel mounted in a housing for spinning about a vertical axis, a source of fluid pressure leading to said gyro wheel within its housing to exert a spinning force to said wheel and a fluid discharge outlet from said housing, means for erecting said gyro to the gravitational vertical, a floating brake disc arranged within said gyro wheel housing and arranged between said wheel and said outlet, control means for reversing said flow for discontinuing said force for evacuating the gyro wheel housing and applying a positive force through said discharge outlet for forcing said brake disc into frictional contact with said gyro wheel to stop the spinning of the same until said gyro is properly erected and guide means for said brake disc in its vertical movements.

BERT G. CARLSON.